Dec. 8, 1925.
H. E. WARREN
1,564,804
TEMPERATURE CONTROL DEVICE
Filed April 16, 1925
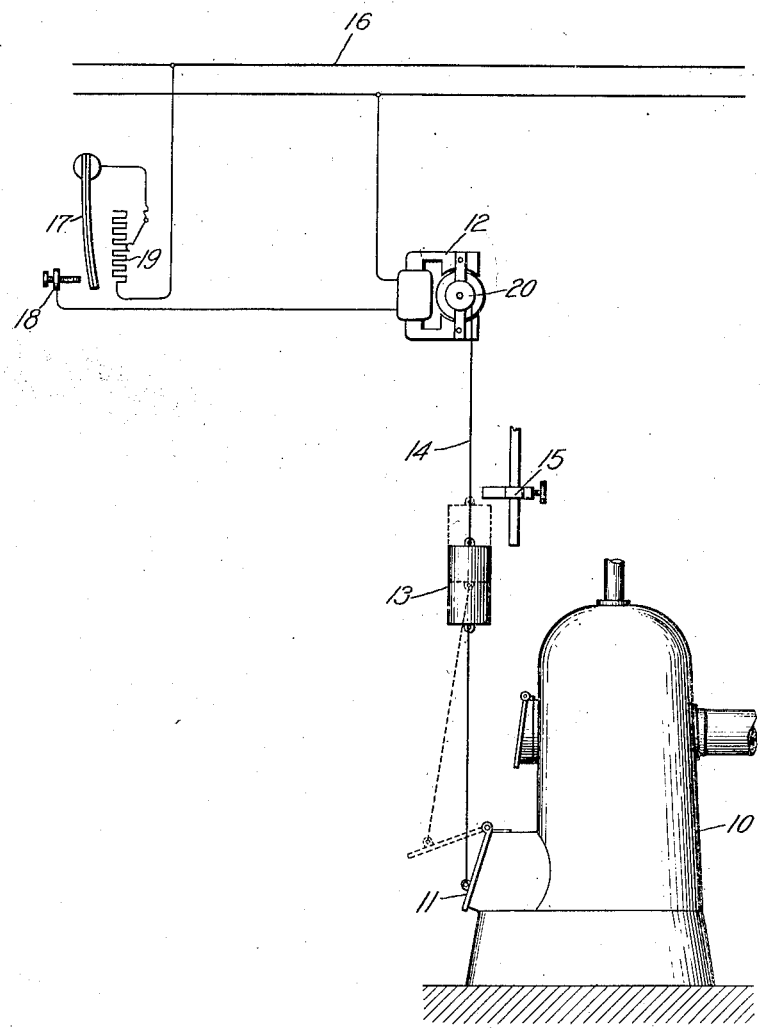
Inventor:
Henry E. Warren,
by Alexander F. Smith
His Attorney.

Patented Dec. 8, 1925.

1,564,804

UNITED STATES PATENT OFFICE.

HENRY E. WARREN, OF ASHLAND, MASSACHUSETTS, ASSIGNOR TO GENERAL ELECTRIC COMPANY, A CORPORATION OF NEW YORK.

TEMPERATURE-CONTROL DEVICE.

Application filed April 16, 1925. Serial No. 23,690.

*To all whom it may concern:*

Be it known that I, HENRY E. WARREN, a citizen of the United States, residing at Ashland, in the county of Middlesex, State of Massachusetts, have invented certain new and useful Improvements in Temperature-Control Devices, of which the following is a specification.

My invention relates to temperature control devices of the thermostat type and in particular to such a device which is self-compensated in such a way as to anticipate rising temperature changes before they actually occur so as to make possible a more even temperature control.

The invention is particularly adapted for the heat regulation of buildings and will be explained as for such use.

The ordinary arrangement for controlling temperature is to provide a thermostat device in the room where the temperature is to be controlled which thermostat controls circuits leading to some type of motor in the basement of the building which opens or closes the dampers of a furnace according to the thermostat signal that the temperature is too high or too low. This results in a periodic action because when the temperature is too low and the thermostat actuates the motor so as to open the drafts of the furnace, an appreciable time elapses before the fire increases and the heat is transferred to the room where the thermostat is located and on account of the latent heat of the air and water or other material which is involved, the delay is very considerable. When the temperature rise does finally bring about the damper closing operation of the thermostat, the furnace fire has considerable headway and will go on raising the temperature for some time after the drafts are closed.

The object of the present invention is to provide a simple arrangement by means of which the above mentioned difficulty is avoided with a consequent closer control of the temperature and a saving of fuel. In carrying my invention into effect, I provide a small electric heater in close proximity of the thermostat the circuit of which is closed when the thermostat operates to open the furnace drafts. This heater raises the temperature adjacent the thermostat more or less depending upon the surrounding room temperature so that the thermostat will operate to close the damper before the fire gains an undesirable headway. The damper closing operation of the thermostat deenergizes the heater circuit and the thermostat quickly cools to room temperature and will immediately repeat its operation if the temperature is still too low. In this way the furnace damper is opened and closed frequently, the duration of opening becoming shorter and the duration of closure longer as the room temperature increases to the desired value. In this way the fire is kept burning at a more even rate and excessively high and low temperatures are avoided.

The features of my invention which are believed to be novel and patentable will be pointed out in the claims appended hereto. For a better understanding of the invention reference is made in the following description to the accompanying drawing illustrating the application of the invention to a house furnace control.

In the particular embodiment of my invention shown in the drawing, 10 represents the furnace and 11 its control damper. The damper is arranged to be opened by an electric motor 12 when the latter is energized and to be closed by a weight 13 when the motor is deenergized. For this purpose the damper is connected by a cord 14 including the weight 13 to a winding drum 20 on the motor. An adjustable stop 15 may be provided to limit the opening movement of the damper. The motor 12 is arranged to be energized from a source 16 and to be controlled by a temperature responsive contact device 17. The device 17 consists of a bimetallic conductor fixed at one end and arranged to bend away from an adjustable contact 18 in response to temperature rise. Preferably contained in the motor circuit with the bi-metallic member 17 and contact 18 is a heating device here represented as an adjustable resistance element 19 arranged in close proximity to the member 17 and acting as an auxiliary heater therefor when the circuit is closed. The thermostat device is of course placed in the room where the temperature is to be controlled.

The operation is as follows: When the temperature is above that for which the contact 18 is set, the member 17 is bent away from the contact so as to open the circuit as represented. This allows the weight 13 to descend and close the damper 11. When the room temperature drops, element 17 moves against contact 18 and closes the circuit of the motor which starts and winds up the cord 14 opening the damper. Weight 13 rises until it is stopped by 15 when the motor is stopped, although still energized, and consequently holds the damper open.

As soon as the motor circuit is closed, heater 19 is energized and begins to give off heat. The effect of this heater on the thermostat will depend on the heating capacity of element 19, its proximity to the member 17, the extent to which the two parts are enclosed, etcetera, which factors may be adjusted to whatever is desired.

It will also depend on the room temperature. Thus, if the room is quite cold, the continuous energization of heater 19 may not give sufficient heat to open the circuit, but if the room is only slightly below the temperature at which the contact will close, the additional heat of the resistor 19 will cause it to open shortly after it is closed. Thus, the nearer the room temperature is to that at which the contact is set to close, the quicker will the contact open due to the additional heat given off by the heater. Soon after the circuit is opened, the heater cools to room temperature and if the room is still below the desired temperature for which the thermostat is set, it will close again. By this thermostatic control the amount of draft which the fire receives progressively decreases as the room temperature increases and vice versa, this being accomplished not by the extent of damper opening, but rather by the duration of damper opening. The fire, and likewise the room temperature is thus kept under very close control resulting in very favorable furnace operating conditions as regards the complete and economical consumption of fuel. The heat producing means herein described as a fuel burning furnace 10 may be any other type of heater and the thermal control means used for its progressive regulation without departing from the spirit of my invention.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. In combination a heater, means for regulating said heater, a motor for operating said regulator, a thermostat for controlling said motor and an auxiliary heating element in close proximity to said thermostat and controlled thereby for modifying its controlling function.

2. An automatic heat regulating system comprising a heater, a thermostat in the place to be heated, a motor controlled by said thermostat for regulating said heater and an auxiliary electric heating element controlled by said thermostat for modifying its controlling function.

3. In a heat regulating system, a heater, an electric motor for regulating said heater, an auxiliary electric heater in close proximity to said thermostat and electric contacts controlled by said thermostat for opening and closing the energizing circuits of said motor and electric heater.

4. In a heat regulating system, a heater, an electric motor for regulating said heater, a thermostat, contacts controlled by said thermostat for opening and closing the energizing circuit of said motor, and an electric heater in close proxmity to said thermostat included in said circuit.

5. In a heat regulating system, a heater, a regulator for said heater, an electric motor which when energized operates said regulator to increase the heat produced by said heater, means for operating said regulator in the reverse direction when said motor is deenergized, a thermostat responsive to the heating effect of said heater for closing and opening the circuit of said motor and an auxiliary electric heater in close proximity to said thermostat arranged to be energized and deenergized with said motor.

6. In a heat regulating system, a heater, a regulator for said heater, means for moving said regulator to heat reducing and heat increasing positions, a thermostat for controlling said regulator moving means, and an auxiliary heater in close proximity to said thermostat arranged to be put into operation when said regulator is moved to a heat increasing position and to be put out of operation when said regulator is moved to a heat reducing position.

7. In a heat regulating system, a fuel burning heater, a regulator for said heater the position of which controls the rate of fuel combustion, a motor for moving said regulator to a position to increase the rate of combustion, a weight for moving said regulator to decrease the rate of combustion, the weight being effective only when the motor is deenergized, a thermostat influenced by the heat given off from said heater adjusted to energize the motor whenever the temperature at the thermostat falls below a predetermined value and to deenergize said motor whenever such temperature rises to said value, and means controlled by the thermostat for progressively reducing the regulating action performed thereby as the temperature approaches the predetermined value.

In witness whereof, I have hereunto set my hand this ninth day of April, 1925.

HENRY E. WARREN.